United States Patent
Han et al.

(10) Patent No.: US 12,024,786 B1
(45) Date of Patent: *Jul. 2, 2024

(54) METHODS OF FORMING ACTIVE MATERIALS FOR ELECTROCHEMICAL CELLS USING LOW-TEMPERATURE ELECTROCHEMICAL DEPOSITION

(71) Applicant: GRU Energy Lab Inc., San Jose, CA (US)

(72) Inventors: Song Han, Foster City, CA (US); Sa Zhou, San Jose, CA (US); Xiaohua Liu, Mountain View, CA (US)

(73) Assignee: GRU Energy Lab Inc., San Jose, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/111,095

(22) Filed: Dec. 3, 2020

Related U.S. Application Data

(60) Provisional application No. 62/943,151, filed on Dec. 3, 2019.

(51) Int. Cl.
  *C25B 1/00* (2021.01)
  *C25B 1/33* (2021.01)
  (Continued)

(52) U.S. Cl.
  CPC .............. *C25D 17/12* (2013.01); *C25D 3/02* (2013.01)

(58) Field of Classification Search
  CPC ... C25D 3/12; C25D 3/20; C25D 3/30; C25D 3/38; C25D 3/50; C25D 3/56;
  (Continued)

(56) References Cited

U.S. PATENT DOCUMENTS

| | | | |
|---|---|---|---|
| 4,869,792 A | * 9/1989 | Geus | B01J 23/06 |
| | | | 205/333 |
| 2014/0227548 A1 | * 8/2014 | Myrick | C10L 1/28 |
| | | | 203/40 |
| 2014/0248543 A1 | * 9/2014 | Zhu | H01M 4/387 |
| | | | 205/60 |

FOREIGN PATENT DOCUMENTS

| | | | | |
|---|---|---|---|---|
| CN | 113629253 A | * | 11/2021 | ............. B82Y 30/00 |
| JP | 2005116264 A | * | 4/2005 | ............... C25D 7/06 |

OTHER PUBLICATIONS

Dogan et al., "Electrodeposited Copper Foams as Substrates for Thin Film Silicon Electrodes," Solid State Ionics (May 1, 2016), vol. 288, pp. 204-206. (Year: 2016).*

(Continued)

*Primary Examiner* — Edna Wong
(74) *Attorney, Agent, or Firm* — Polygon IP, LLP

(57) ABSTRACT

Provided are methods of forming active materials for electrochemical cells using low-temperature electrochemical deposition, e.g., at less than 200° C. Specifically, these processes allow precise control of the morphology, composition, and/or size of the deposited structures. For example, a deposited structure may be doped, alloyed, or surface treated during its formation using a combination of different precursors. In particular, a silicon structure may be prelithiated while being formed. Different working electrodes (e.g., with different surface sizes and properties) allow forming different types of structures, e.g., precipitating particles from the solution or specific types of films deposited on the working electrode. These processes require minimal energy and do not use volatile precursors. Furthermore, these processes produce a more confined waste stream, suitable for post-reaction recycling. Finally, low-temperature electrochemical deposition can be readily scaled up.

18 Claims, 11 Drawing Sheets

(51) Int. Cl.
*C25B 1/50* (2021.01)
*C25D 3/02* (2006.01)
*C25D 17/12* (2006.01)

(58) Field of Classification Search
CPC ........ C25D 3/562; C25D 5/022; C25D 5/263; C25D 3/665; C25B 1/006; C25B 1/20; C25B 1/22; C25B 1/00; C25B 1/33; C25B 1/50
USPC ....... 205/238, 252, 255, 264, 270, 271, 291, 205/118, 564, 615, 560, 57, 59
See application file for complete search history.

(56) References Cited

OTHER PUBLICATIONS

Zhao et al., "Electrodeposited Si Film with Excellent Stability and High Rate Performance for Lithium-Ion Battery Anodes," Materials Letters (Jun. 1, 2012), vol. 76, pp. 55-58. (Year: 2012).*

Zhang et al., "Electrodeposition of Crystalline Silicon Directly from Silicon Tetrachloride in Ionic Liquid at Low Temperature," Rsc Advances (2016), vol. 6, No. 15, pp. 12061-12067. (Year: 2016).*

Agrawal et al., "Electrodeposition of Silicon from Solutions of Silicon Halides in Aprotic Solvents," Journal of the Electrochemical Society (Nov. 1, 1981), vol. 128, No. 11, pp. 2292-2296. (Year: 1981).*

Ishibashi et al., "The Effect of the Deposition Conditions on the Electrodeposition of Si Nanopillars in TMHATFSI," ECS Transactions (Apr. 1, 2013), vol. 50, No. 48, pp. 117-126. (Year: 2013).*

Campbell-Rance, "Electrodeposited Silica Thin Films," (2010), pp. 1-168. (Year: 2010).*

Nicholson, "Electrodeposition of Silicon from Nonaqueous Solvents," Journal of the Electrochemical Society (Oct. 17, 2005), vol. 152, No. 12, pp. C795-C802. (Year: 2005).*

Gattu, Bharat et al., Pulsed Current Electrodeposition of Silicon Thin Films Anodes for Lithium Ion Battery Applications; Inorganics 2017, 5, 27, 14 pgs.

Zhang, Junling et al., Electrodeposition of crystalline silicon directly from silicon tetrachloride in ionic liquid at low temperature; RSC Adv., 2016, pp. 12061-12067.

* cited by examiner

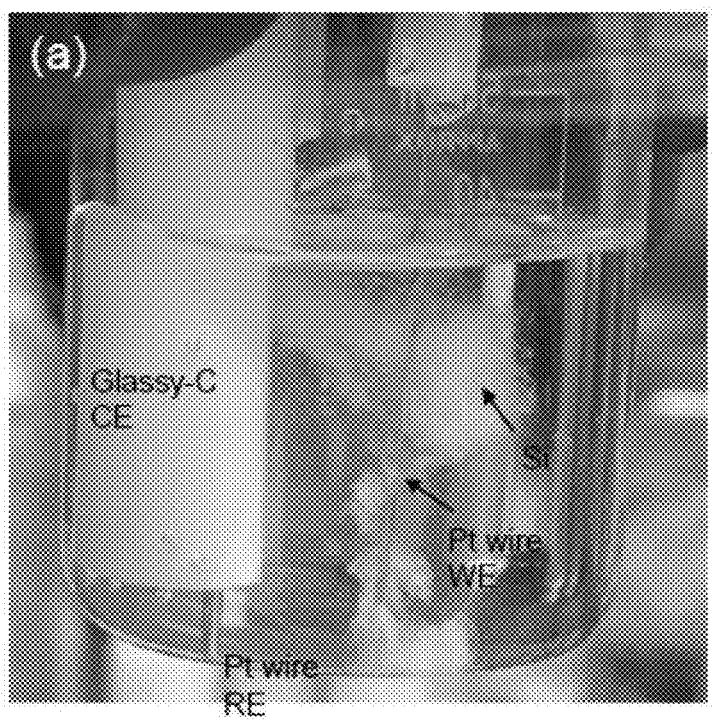 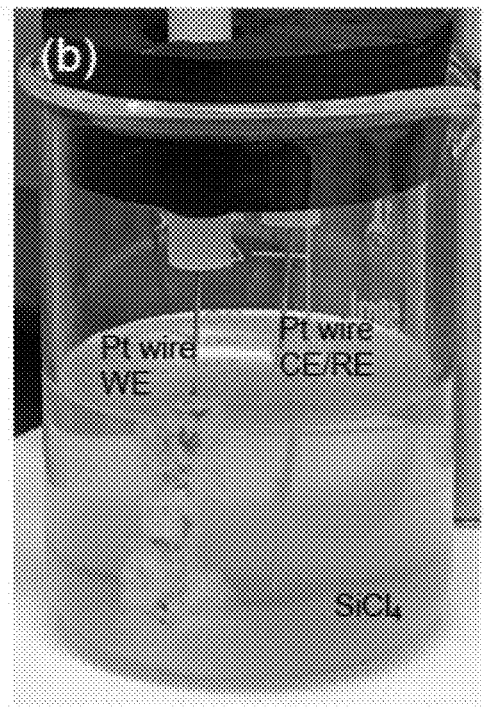
*FIG. 10A*  *FIG. 10B*

METHODS OF FORMING ACTIVE MATERIALS FOR ELECTROCHEMICAL CELLS USING LOW-TEMPERATURE ELECTROCHEMICAL DEPOSITION

CROSS-REFERENCE TO RELATED APPLICATIONS

This application claims the benefit under 35 U.S.C. § 119(e) of U.S. Provisional Patent Application No. 62/943,151, filed on 2019 Dec. 3, which is incorporated herein by reference in its entirety for all purposes.

TECHNICAL FIELD

The present disclosure relates generally to methods of forming active materials for electrochemical cells using low-temperature electrochemical deposition, the active materials formed using these methods, and the electrochemical cells comprising these active materials.

BACKGROUND

Silicon, germanium, and other like materials are important for many applications, such as electronic devices, solar panels, lithium-ion batteries, and grinding medium. However, the production of these materials has been limited to high-temperature processes, such as an ingot grown from a melt and chemical vapor deposition (CVD). These high-temperature processes require significant energy and complex equipment while limiting the type of structures produced using these processes. For example, porosity and other like properties of deposited structures are difficult to control using high-temperature processes. At the same time, low-temperature deposition processes have not been developed for many electrochemical battery materials, such as negative and positive electrode active materials.

What is needed are new methods of forming active materials for electrochemical cells using low temperatures.

SUMMARY

Provided are methods of forming active materials for electrochemical cells using low-temperature electrochemical deposition, e.g., at less than 200° C. Specifically, these processes allow precise control of the morphology, composition, and/or size of the deposited structures. For example, a deposited structure may be doped, alloyed, or surface treated during its formation using a combination of different precursors. In particular, a silicon structure may be prelithiated while being formed. Different working electrodes (e.g., with different surface sizes and properties) allow forming different types of structures, e.g., precipitating particles from the solution or specific types of films deposited on the working electrode. These processes require minimal energy and do not use volatile precursors. Furthermore, these processes produce a more confined waste stream, suitable for post-reaction recycling. Finally, low-temperature electrochemical deposition can be readily scaled up.

In some examples, a method of forming active material structures for electrochemical cells comprises introducing an electroplating solution into an electroplating bath. The electroplating bath comprises a working electrode and a counter electrode. The method also comprises applying an electrical potential between the working electrode and the counter electrode and through the electroplating solution thereby forming the active material structures in the electroplating bath. The active material structures comprise one or more elements selected from the group of silicon (Si), germanium (Ge), copper (Cu), nickel (Ni), iron (Fe), lithium (Li), and titanium (Ti).

In some examples, the working electrode comprises a polished titanium plate. In the same or other examples, the counter electrode comprises a polished glassy-carbon structure. In some examples, the working electrode is a metal foam. For example, the metal foam of the working electrode comprises nickel. In more specific examples, the active material structures form a conformal layer, coating pores of the metal foam. In some examples, the working electrode comprises an insulating mask disposed on a metal surface of the working electrode.

In some examples, the electroplating solution comprises one or more precursors and one or more solvents. For example, the one or more precursors of the electroplating solution are selected from the group consisting of trichlorosilane ($SiHCl_3$), silicon tetrachloride ($SiCl_4$), silicon tetrabromide ($SiBr_4$), silicon tetraiodide ($SiI_4$), germanium halides, and metal salts. In the same or other examples, the one or more precursors of the electroplating comprise a combination of trichlorosilane and at least one of lithium chloride and titanium tetrachloride. In some examples, the one or more solvents of the electroplating comprise at least one of propylene carbonate (PC), dimethyl carbonate (DMC), or an ionic liquid. In some examples, the electroplating solution further comprises one or more conductivity agents selected from the group consisting of tetra butylammonium chloride ($Bu_4NCl$), tetrapropylammonium chloride ($Py_4NCl$), tetraethylammonium chloride ($Et_4NCl$), and lithium chloride (LiCl).

In some examples, the electroplating solution is maintained at a temperature of less than 200° C. For example, the electroplating solution is maintained at a temperature between 15° C. and 25° C.

In some examples, the active material structures comprise a combination of silicon and lithium. In some examples, the active material structures are formed by precipitation in the electroplating solution. In the same or other examples, the active material structures are formed by deposition on the working electrode.

In some examples, the electroplating bath further comprises a reference electrode, formed from one or more of glassy carbon (glassy-C), platinum (Pt), gold (Au), or silicon (Si).

In some examples, each of the active material structures comprises a core and a shell, such that the shell has a different composition or structure from the shell.

In some examples, the method further comprises agitating the electroplating solution into the electroplating bath to cause a flow of the electroplating solution around the working electrode.

In some examples, the method further comprises recovering the active material structures from the electroplating solution.

BRIEF DESCRIPTION OF THE DRAWINGS

FIG. 11 is a schematic block diagram of an electroplating solution for the low-temperature electrochemical deposition, in accordance with some examples.

FIGS. 10A and 10B are photos of an apparatus showing silicon precipitation in the solution (FIG. 10A) and plated on one of the electrodes (FIG. 10B).

DETAILED DESCRIPTION

Figure 1A:
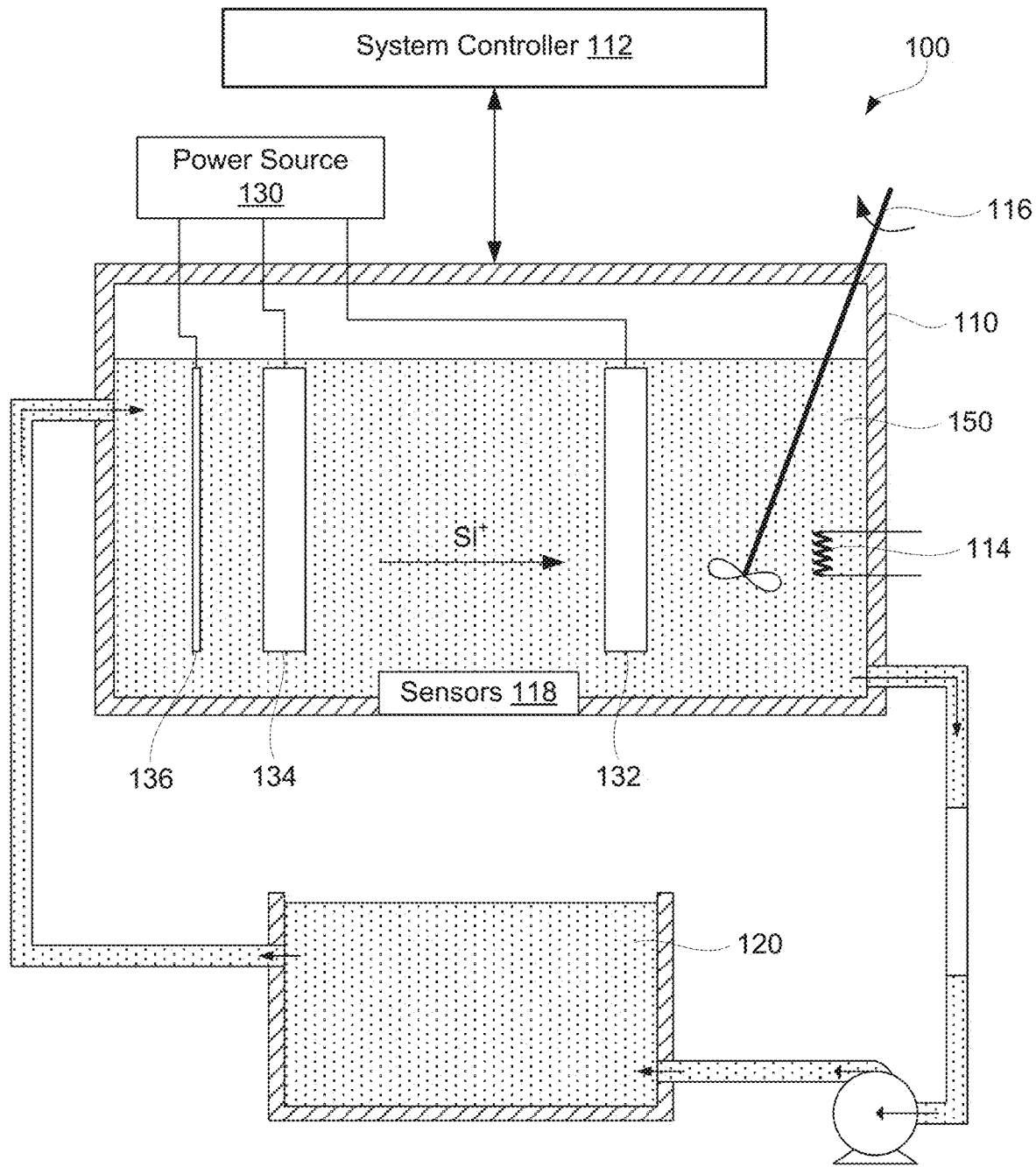
FIG. 1A is a schematic illustration of a system for low-temperature electrochemical deposition of active material structures for electrochemical cells, in accordance with some examples.

In the following description, numerous specific details are outlined in order to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

Silicon, tin, germanium, and many other similar materials are used for a wide range of applications, such as electronic devices, solar panels, lithium-ion batteries, grinding medium, and the like. Currently, silicon is produced using processes that involve high energy input (e.g., ingots grown from a melted metal pool) and/or expensive gas phase deposition (e.g., chemical vapor deposition (CVD) using silicon-containing precursors such, as silane). These processes are expensive and provide minimal control over the characteristics of deposited silicon structures. One major limitation is the high temperatures, needed for these conventional processes. As such, these processes may be also referred to as high-temperature deposition processes. For purposes of this disclosure, a high-temperature deposition is defined as a process performed at a temperature of 500° C. or greater.

Forming silicon structures at low temperatures (e.g., at room temperature) is desirable and provides various process control options, which are not available with high-temperature deposition. For purposes of this disclosure, a low-temperature deposition is defined as a process performed at a temperature of 200° C. or less. One example of low-temperature deposition is a liquid-phase deposition process, which may be also referred to as plating. For example, liquid-phase deposition may be used to form silicon structures from one or more precursors, provided in a liquid solution. These silicon structures are formed on a harvesting substrate (e.g., a working electrode) and/or precipitate in the solution as suspended particles (which may gravitationally settle at the bottom of the deposition tank for further collection). Electrochemical potentials applied between electrodes submerged into the solution are used to control the deposition process, such as ensuring high reaction rates at low temperatures.

Low-temperature deposition, described herein, provides unique opportunities, not available in conventional high-temperature processes, to control characteristics of the deposited structures. Some examples of these characteristics are morphology (e.g., porosity), composition, and/or size of the deposited structures. These characteristics may be referred to as controlled characteristics. Controllable process parameters include a voltage potential applied between the electrodes, various characteristics of the working electrodes (e.g., the surface area, surface structure, composition, conductivity, and the like), the plating solution composition, the plating solution temperature, the degree of agitation of the plating solution, and the like. One unique aspect of the described low-temperature deposition is the ability for doping, alloying, and/or surface treatment using sequential deposition and/or co-deposition. This type of doping may be referred to as in-situ doping. For example, silicon structures may be prelithiated while forming these structures. Traditional prelithiation methods usually require an added step to incorporate lithium into previously formed silicon structures. In some examples, this incorporation step is performed after integrating these structures into negative electrodes, which presents challenges. Additional benefits of low-temperature deposition include lower energy requirements and simpler tooling. The low-temperature deposition does not use volatile and invisible precursors, which are challenging to handle, and produces a more confined waste stream, suitable for post-reaction recycling. Finally, the low-temperature electrochemical deposition can be readily scaled up. The bath and electrode sizes can be chosen to fit the production requirements. A circulated solution can be supplied to maintain uninterrupted production. This leads to high utilization of raw materials and yield.

A brief example of low-temperature deposition involves dissolving one or more silicon-containing precursors, such as trichlorosilane ($SiHCl_3$) or silicon tetrachloride ($SiCl_4$), silicon tetrabromide ($SiBr_4$), silicon tetraiodide ($SiI_4$), in one or more solvent forming an electroplating solution. At least two electrodes, e.g., a working electrode and a counter electrode, are submerged into the electroplating solution and an electrical potential is applied between the electrodes. The potential triggers the electrochemical decomposition of the precursor and forming silicon structures, e.g., deposited on the working electrode and/or precipitated within the solution.

Deposition System Examples

FIG. 1A is a schematic illustration of deposition system 100 for the low-temperature electrochemical deposition of active materials to be used in electrochemical cells, in accordance with some examples. It should be noted that electrochemical cells (e.g., batteries), in which these active materials are used, are different from system 100, in which these active materials are formed/deposited. Nevertheless, system 100 utilizes various electrochemical processes, which are in some aspects similar to electrochemical cells.

In some examples, deposition system 100 comprises electroplating bath 110, in which electroplating solution 150 is contained during operation of deposition system 100. Various examples of electroplating solution 150 are described below with reference to FIG. 1B. Electroplating bath 110 may seal electroplating solution 150 to prevent evaporation. Furthermore, electroplating bath 110 is connected to various other components of deposition system 100, further described below.

Deposition system 100 further comprises electrical power source 130, connected to working electrode 132 and counter electrode 134 and, in some examples, also to reference electrode 136. Working electrode 132, counter electrode 134, and reference electrode 136 are submerged into electroplating solution 150 during the operation of deposition system 100. Power source 130 applies the electrical potential between working electrode 132 and counter electrode 136, which results in the electrical current between working electrode 132 and counter electrode 136. This current is caused by ions flowing within electroplating solution 150 between working electrode 132 and counter electrode 136. For example, during the low-temperature deposition of silicon, electroplating solution 150 comprises silicon ions, provided as one or more precursors when electroplating solution 150 is formed. These silicon ions migrate to working electrode 132 where the silicon ions combine with electrons resulting in the electrochemical formation of silicon structures, which are precipitated in electroplating solution 150 and/or deposited on working electrode 132.

In some examples, working electrode 132 comprises or formed from titanium (Ti), platinum (Pt), nickel (Ni), copper (Cu), stainless steel, silicon (Si) wafers glassy carbon (glassy-C), or other metallic or semiconducting substrates. Various characteristics of working electrode 132 influence the properties of deposited structures. Some of these characteristics are the surface area, surface structure, composition, conductivity, and crystallographic orientation. For example, a silicon wafer having <111> crystal orientation, used as working electrode 132, produces different types of deposited structures than a silicon wafer having <100> crystal orientation as further described below with reference to FIGS. 5A-5D. Furthermore, using a small platinum wire as working electrode 132 while applying a high electrical potential results in precipitation of deposited structures right into electroplating solution 150, rather than deposition on working electrode 132. This combination of the electrode size and potential forms structures right in electroplating solution 150 before reaching the electrode. The deposition is diffusion and surface limited. On the other hand, increasing the size of working electrode 132 and/or decreasing the potential shifts this precipitation in electroplating solution 150 to the deposition on the surface of working electrode 132. Ions now have sufficient time to reach the surface of working electrode 132 and deposit a structure on that surface.

A specific example of working electrode 132 includes a polished titanium plate or a stainless steel plate. However, other examples are also within the scope. In some examples, counter electrode 134 comprises or is formed from glassy carbon (glassy-C), platinum (Pt), gold (Au), or silicon (Si). In general, any inert conductive materials are suitable for counter electrode 134, e.g., conductive materials that are not susceptible to electrochemical reactions with components of electroplating solution 150. In some examples, the counter electrode has a larger size than that of the working electrode.

In some examples, reference electrode 136 comprises or is formed from platinum, glassy carbon (glassy-C), or any other conductive materials that are not susceptible to electrochemical reactions with components of electroplating solution 150. Power source 130 does not apply a potential to reference electrode 136. Instead, readings are obtained from reference electrode 136 (e.g., a potential between reference electrode 136 and working electrode 132). These reading may be used for controlling power source 130, e.g., to adjust the potential between working electrode 132 and counter electrode 134.

Power source 130 is configured to apply an electric potential between working electrode 132 and counter electrode 134. In some examples, the applied electric potential, (from the perspective of working electrode 132) is between −0.5V to −10V or, more specifically, between −1V and −5V. As noted above, a lower electric potential (based on the absolute value) may be used for depositing structures on the surface of working electrode 132. A higher electric potential (based on the absolute value) may be used for precipitating structures in electroplating solution 150. In some examples, the potential is chosen based on a stable window of all chemicals in electroplating solution 150.

In some examples, deposition system 100 comprises heater 114, for maintaining the temperature of electroplating solution 150 at between 15° C. and 200° C. For example, electroplating solution 150 may be maintained at a room temperature of 15° C.-25° C. In some examples, the deposition is performed at a higher temperature than the room temperature, e.g., at 40° C.-60° C. For example, electroplating solution 150 comprising a mineral oil may be used for the above-the-room-temperature processes. When electroplating bath 110 is sealed, the temperature of up to 200° C. may be used. In general, a higher plating current may be higher at a higher temperature due to higher ion mobility and faster deposition reactions. However, the increase in temperature may also trigger various side reactions, such as the decomposition of solvents and/or supporting electrolyte salts. As such, low-temperature processes do not exceed 200° C.

In some examples, deposition system 100 comprises agitator 116 to ensure uniformity of electroplating solution 150 throughout the entire volume of electroplating bath 110. Some examples of agitator 116 include, but are not limited to a propeller, ultrasonic agitator, and the like. Agitator 116 helps the supply of fresh ions to working electrode 132 as ions are being consumed to form deposited structures.

In some examples, deposition system 100 comprises system controller 112, controlling the operation of various components of system 100, such as the operation of power source 130, agitator 116, heater 114, and the like. Furthermore, deposition system 100 may comprise various sensors 118, which provide output to system controller 112. In some examples, sensors 118 are configured to capture various characteristics of electroplating solution 150, e.g., the solution temperature, the solution conductivity, the concentration of various components, and the like.

In some examples, deposition system 100 comprises solution source 120, which is fluidically coupled to electroplating bath 110 and configured to deliver electroplating solution 150 into electroplating bath 110 and to recondition electroplating bath 110, e.g., add depleted components (e.g., ions) and remove reaction products.

Figure 1B:
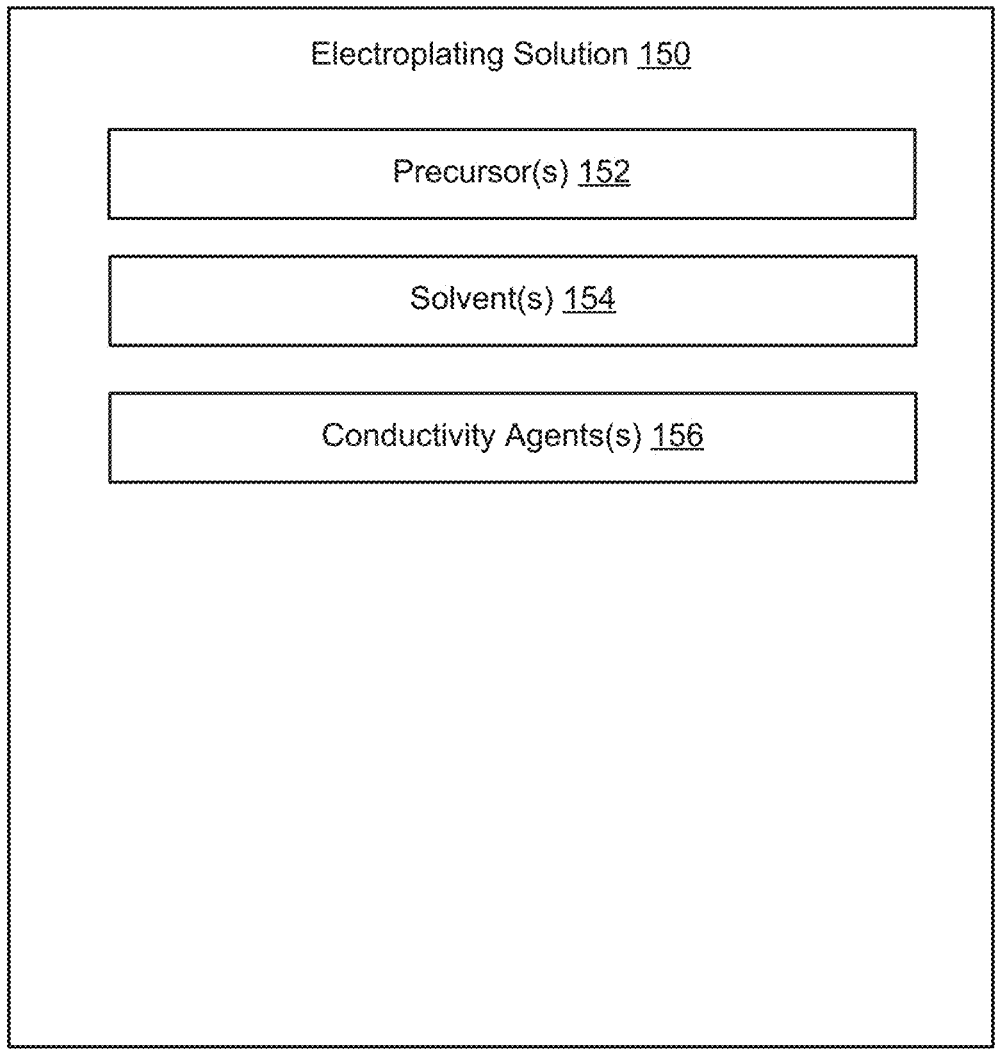

Referring to FIG. 1B, in some examples, electroplating solution 150 comprises one or more precursors 152 and one or more solvents 154. Precursor 152 comprises one or more materials, e.g., silicon (Si), germanium (Ge), copper (Cu), nickel (Ni), iron (Fe), lithium (Li), and titanium (Ti). Some examples of precursor 152 are trichlorosilane ($SiHCl_3$), silicon tetrachloride ($SiCl_4$), and other silicon halides, germanium halides, or metal salts. In some examples, electroplating solution 150 comprises a combination of two or more precursors 152, such as trichlorosilane, lithium chloride, and titanium tetrachloride. The concentration of one or more precursors 152 in electroplating solution 150 may be between 0.01 and 10 moles per liter. Some examples of solvents 154 include, but are not limited to, propylene carbonate (PC), dimethyl carbonate (DMC), and ionic liquids. Solvents 154 are selected to ensure that precursor 152 can dissolve at given concentrations and temperatures.

In some examples, electroplating solution 150 comprises one or more conductivity agents 156, such as tetrabutylammonium chloride ($Bu_4NCl$), tetrapropylammonium chloride ($Py_4NCl$), tetraethylammonium chloride ($Et_4NCl$), and lithium chloride (LiCl). Unlike precursor 152, conductivity agents 156 do not participate in electrochemical reactions, but provide non-reacting ions, e.g., chloride, to support ionic transport within electroplating solution 120.

Processing Examples

Figure 2:
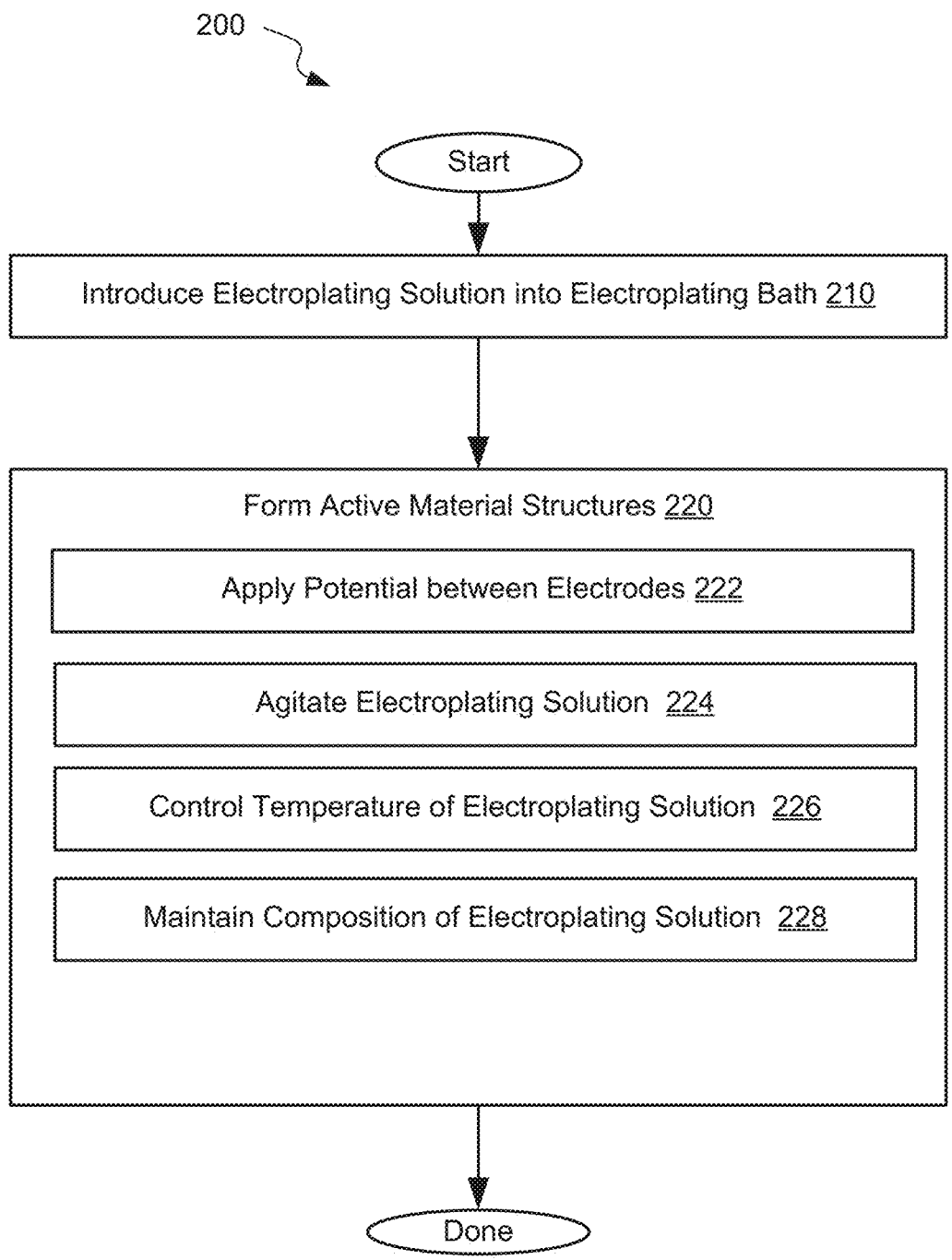
FIG. 2 is a process flowchart of a method for the low-temperature electrochemical deposition of active materials for electrochemical cells, in accordance with some examples.

FIG. 2 is a process flowchart corresponding to method 200 of forming active materials for electrochemical cells using low-temperature electrochemical deposition, in accordance with some examples.

Method 200 comprises introducing electroplating solution 150 into electroplating bath 110 (referring to block 210 in FIG. 2). Various examples of electroplating solution 150 and electroplating bath 110 are described above. Electroplating solution 150 may be maintained at a temperature of between 10° C. and 200° C. Various temperature considerations are described above.

Method 200 proceeds with forming active material structures (referring to block 220 in FIG. 2). Specifically, an electrical potential is applied between working electrode 132 and counter electrode 134 (referring to block 222 in FIG. 2). Various examples of working electrode 132 and counter electrode 134 are described above. Furthermore, various examples of electrical potentials and their effects on the formed active material structures are described above. Depending on the size of working electrode 132 and the electrical potentials, the active material structures may be formed on the surface of working electrode 132, precipitate in electroplating solution 150, or both.

In some examples, working electrode 132 is a polished titanium plate, while counter electrode 134 is a polished Glassy-C electrode. The applied electrical potential is −2.5 V (versus reference electrode 136). The current density is about 1 mA/cm². It should be noted that the current density decreases as silicon structures are deposited onto the working electrode, which increases the impedance.

In some examples, working electrode 132 is a complex substrate (e.g., nickel foam) such that a conformal silicon coating is formed on the surface of this substrate. The patterned substrate, such as a conducting substrate with insulating mask patterns, can also be used to deposit silicon onto specific areas and make electrodes.

In some examples, method 200 also comprises agitating electroplating solution 150 (referring to block 224 in FIG. 2), which is performed, at least in part, while forming the active material structures (block 220). As noted above, agitation is used to maintain the composition of electroplating solution 150 around working electrode 132 (e.g., as ions are consumed to form the deposited structures).

In some examples, method 200 further comprises controlling the temperature of electroplating solution 150 (referring to block 226 in FIG. 2), which is performed, at least in part, while forming the active material structures (block 220). The temperature is less than 200° C. to avoid undesirable side reactions, escape of electroplating solution components into the environment, simplify the construction of electroplating bath 110. Other examples of suitable temperatures are described above.

In some examples, method 200 also comprises maintaining the composition of electroplating solution 150 (referring to block 228 in FIG. 2), which is performed, at least in part, while forming the active material structures (block 220). The composition is maintained to ensure consistent deposition. Maintaining the composition of electroplating solution 150 replenishing precursors in electroplating solution 150 and removing byproducts from electroplating solution 150. Various examples of this operation are within the scope, such as filtration, reconditioning, recirculation, and the like.

Examples of Active Material Structures

Figure 3A:
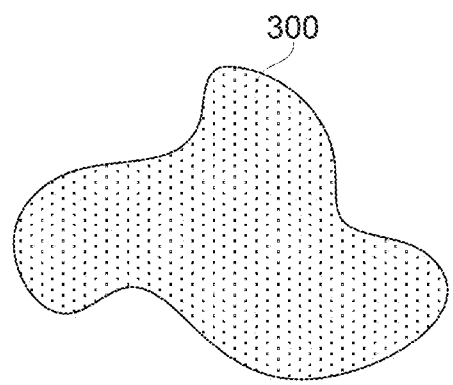
FIGS. 3A and 3B are schematic illustrations of different examples of active material structures, which have been electrochemically deposited at low temperatures.
Figure 3B:
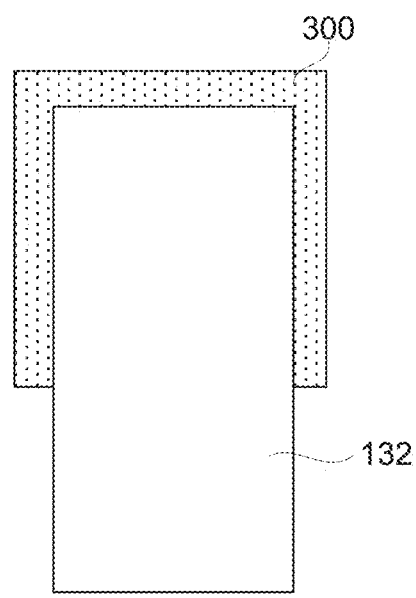

FIGS. 3A and 3B illustrate various examples of active material structure 300 formed using low-temperature electrochemical deposition. Specifically, FIG. 3A illustrates active material structure 300 as a standalone structure, which may be formed by precipitating in electroplating solution 150. FIG. 3B illustrates active material structure 300 as a coating over working electrode 132, which may be used as a current collector substrate.

In some examples, active material structure 300 comprises silicon (Si), germanium (Ge), copper (Cu), nickel (Ni), iron (Fe), titanium (Ti), and various combinations thereof, such as Si—Ge or Si-Me, where Me represent one or more transitional metals (e.g., copper (Cu), nickel (Ni), and iron (Fe), and the like). In some examples, active material structure 300 comprises silicon (Si) and lithium (Li), which may be referred to as prelithiated silicon. Introducing lithium into silicon may be used to compensate for irreversible trapping of lithium in active materials structures, during the operation of the electrochemical cell.

In some examples, active material structure 300 comprises a core and a shell, such that the shell has a different composition or structure from the shell. In some examples, thin and two-dimensional sheets are produced by electrodeposition or pulsed deposition. Such sheets generally cannot be formed using a high-temperature CVD process. This limitation is due to the intrinsic anisotropic nature of electrochemical deposition based on the current direction.

Examples of Electrode and Electrochemical Cells/Applications

Figure 4A:
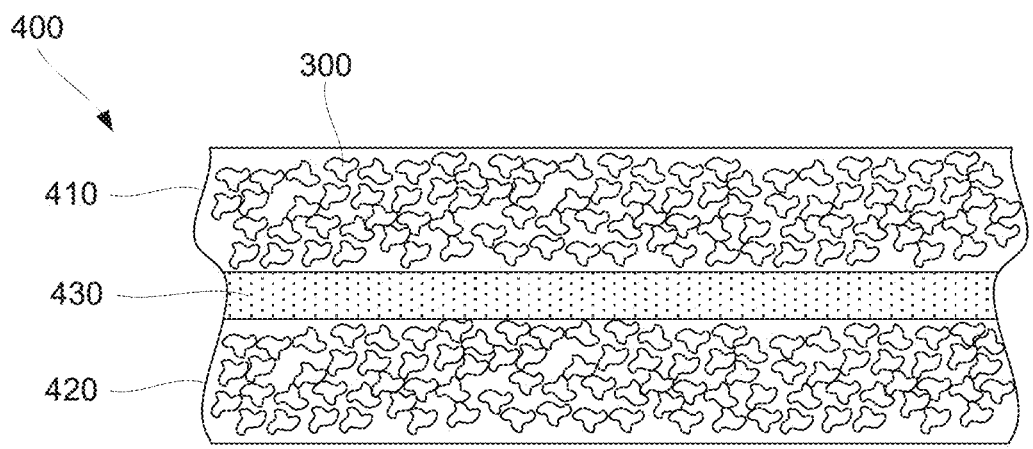
FIG. 4A is a schematic illustration of an electrode, comprising active material structures formed using low-temperature electrochemical deposition, in accordance with some examples.

In some examples, electrodeposited negative active materials, are used in an electrode of an electrochemical cell. FIG. 4A is a schematic illustration of electrode 400, comprising current collector 430, first active layer 410, and, optionally, second active layer 420. In this example, first active layer 410 and second active layer 420 are supported by current collector 430, which also provides electric communication between first active layer 410 and second active layer 420 and other components of the cell. In some examples, current collector 430 is a working electrode of system 100, described above with reference to FIG. 1A.

One or both first active layer 410 and second active layer 420 may comprise active material structures 300. Active material structures 300 are configured to receive and release ions during cycling of the electrochemical cell. Furthermore, active material structures 300 may be used as conductive additives. In these examples, first active layer 410 and second active layer 420 comprise other active materials. Furthermore, in these examples, the amount of conventional conductive additives (e.g., Carbon Black, Super P) used in first active layer 410 and second active layer 420 may be reduced or completely eliminated. In some examples, active material structures 300 are used as ionic sources (e.g., lithium source) to compensate for ionic losses in the cell (e.g., to form an SEI layer). First active layer 410 and second active layer 420 may comprise a binder, other active materials, and/or other conductive additives in addition to active material structures 300.

Figure 4B:
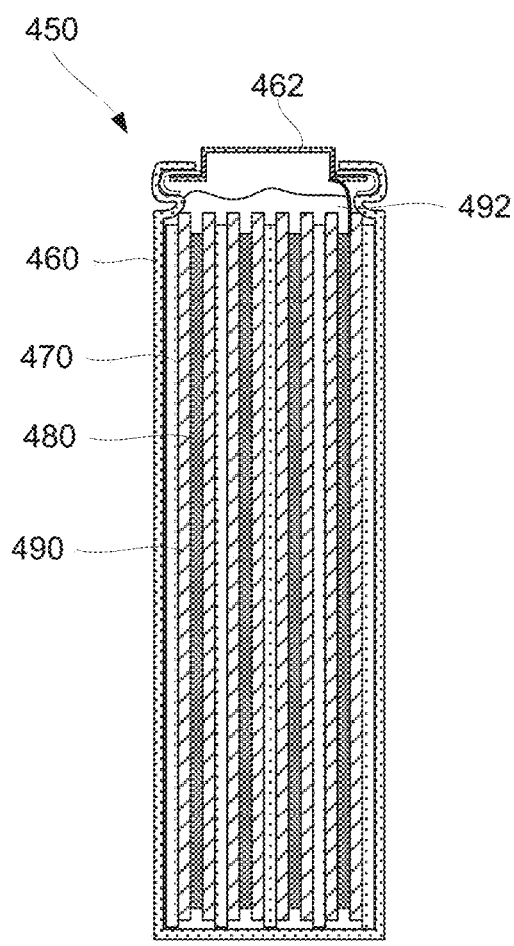
FIG. 4B is a schematic illustration of an electrochemical cell, comprising two electrodes, at least one of which comprises active material structures formed using low-temperature electrochemical deposition, in accordance with some examples.

FIG. 4B is a schematic illustration of electrochemical cell 450, comprising first electrode 470, second electrode 480, and separator 490 arranged in a stack, wound jelly-roll, or any form. First electrode 470, second electrode 480, or both may include electroplated active material structures as described with reference to FIG. 4A above. Separator 490 is disposed between first electrode 470 and second electrode 480 to prevent direct contact between first electrode 470 and second electrode 480 yet allows ionic communication between these electrodes. Specifically, separator 490 may include pores allowing ions to pass. Electrochemical cell 450 also includes electrolyte 492, which operates as a carrier of ions during the cycling of electrochemical cell 450. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of electrochemical cell 450 include, but are not limited to, lithium ion batteries, lithium polymer batteries, lithium air batteries, lithium sulfite batteries, lithium metal batteries, solid-state batteries, super capacitors, and the like.

Experimental Results

A series of tests were conducted to determine various parameters of low-temperature electrochemical deposition of silicon structures and the characteristics of these deposited structures.

In one test, 0.8 grams of tetrabutylammonium chloride ($Bu_4NCl$) was dissolved in 36 grams of propylene carbonate (PC) solvent. Thereafter, 4 grams of trichlorosilane ($SiHCl_3$) were added to form an electroplating solution. Trichlorosilane is a precursor for silicon deposition, while tetra butylammonium chloride is used to improve ionic conductivity of the solution.

Figure 5A:
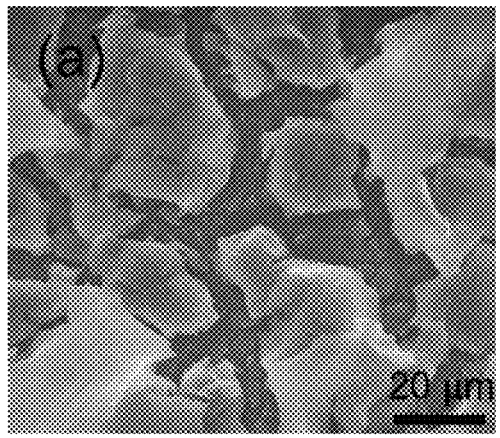
FIGS. 5A-5D are scanning electron micrograph (SEM) of various silicon structures formed using the low-temperature electrochemical deposition.
Figure 5B:
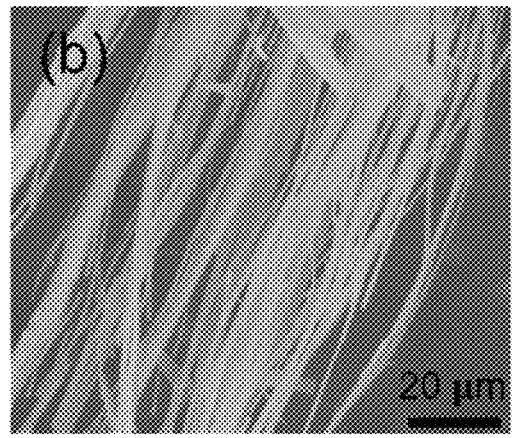
Figure 5C:
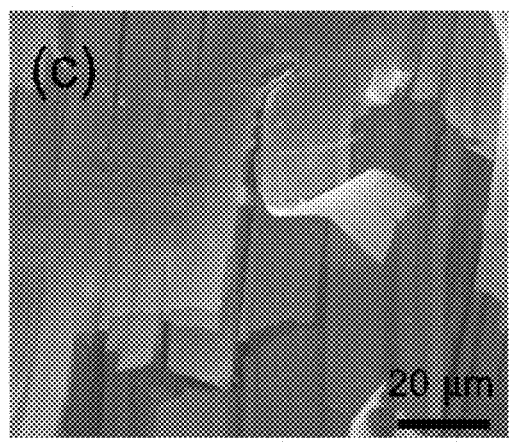
Figure 5D:
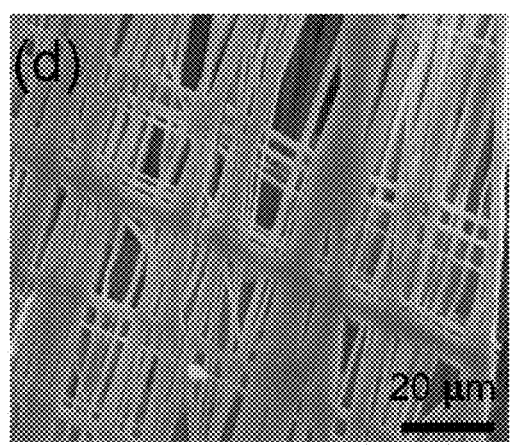

It has been found that the morphology of plated silicon can be controlled by varying electroplating parameters. In some examples, silicon particles are obtained using a metal substrate (e.g., Ti, Ni) or a silicon wafer having the <111> crystal orientation is used as a working electrode. One example of these silicon particles is shown in FIG. 5A. In other examples, silicon fibers, nanowires, flakes, and meshes can be obtained using a silicon wafer having the <100> crystal orientation as a working electrode. The potential range for these examples was selected between −2.5 V and −3 V. The results of these experiments are shown in FIGS. 5B-5D.

In this experiment, a polished titanium plate was used as a working electrode, while a polished Glassy-C electrode was used as a counter electrode. Finally, a platinum wire was used as a reference electrode. The working electrode potential was set at −2.5 V versus the reference electrode, while the current density was about 1 $mA/cm^2$. The current has decreased as silicon was deposited onto the working electrode. These silicon deposits result in an increased impedance. Furthermore, these silicon deposits were evidenced by the darkening of the submerged portion of the working electrode. The electrodes were rinsed with dimethyl carbonate (DMC) to remove the deposited sample, which were collected for further processing and testing.

Figure 6A:
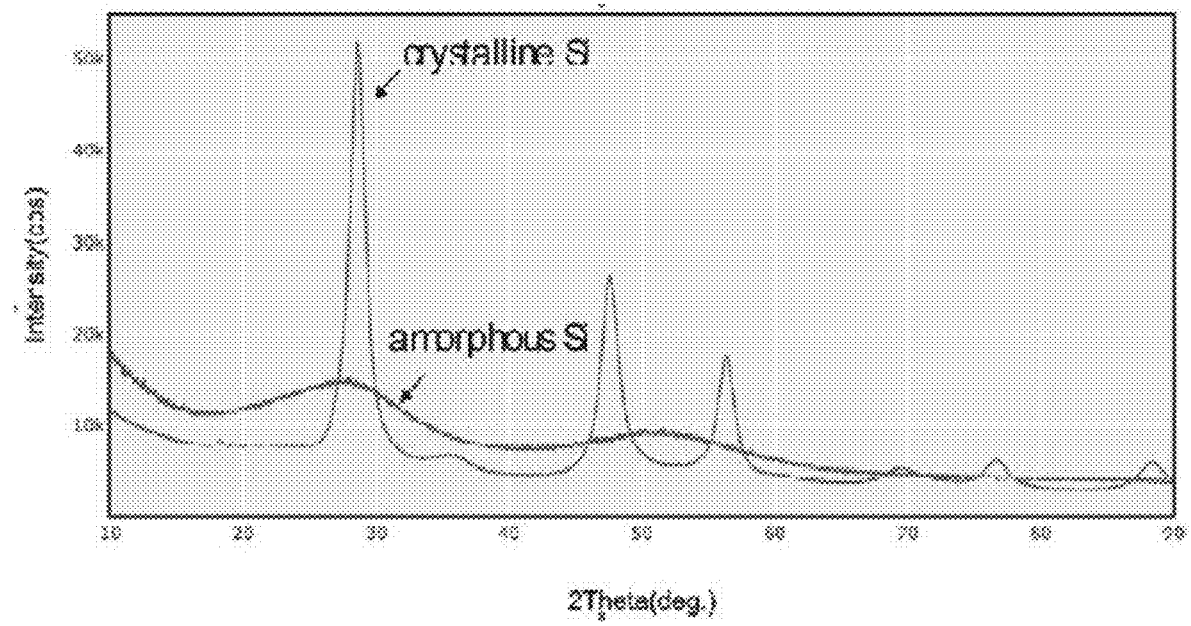
FIG. 6A illustrates the results of X-ray diffraction (XRD) analysis of electrochemically deposited silicon structures before and after annealing.
Figure 6B:
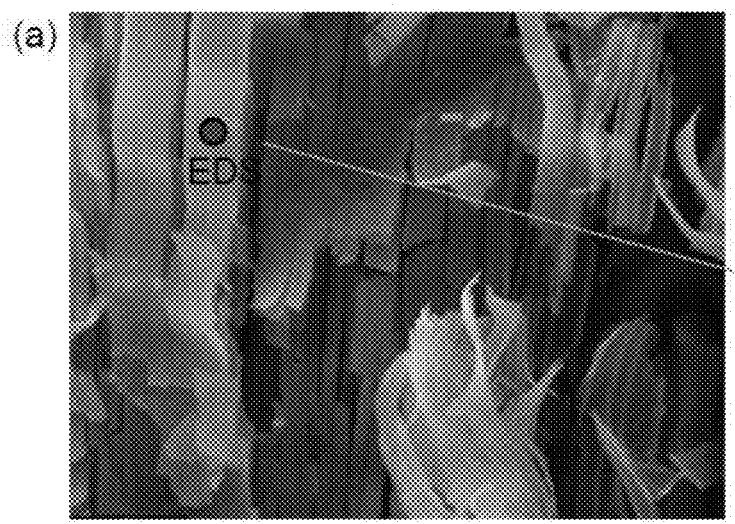
FIG. 6B is an SEM of the deposited silicon structures prior to annealing showing uniform agglomerates of distinct morphology.
Figure 6C:
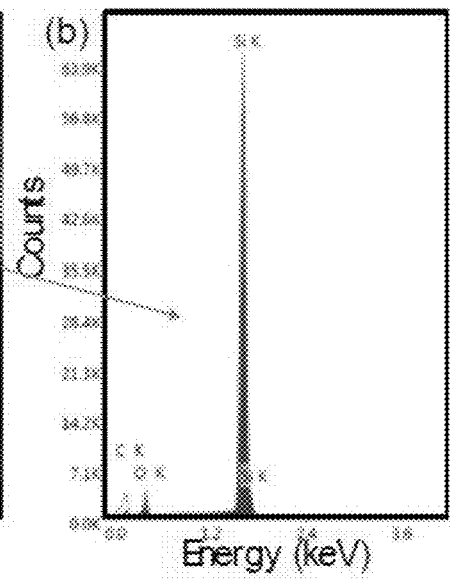
FIG. 6C illustrates the results of energy dispersive spectrum (EDS) analysis of the sample shown in FIG. 6B.

Crystalline silicon was then obtained by annealing the deposited amorphous Si at temperatures of between 600° C. and 1000° C. FIG. 6A illustrates the results of X-ray diffraction (XRD) analysis of the electrochemically deposited silicon before and after annealing. Furthermore, scanning electron micrograph (SEM) in FIG. 6B of the deposited sample before the annealing shows uniform agglomerates of distinct morphology. The elemental analysis, performed using energy dispersive spectrum (EDS) and shown in FIG. 6C, indicated that silicon is the main material in the deposited sample. Traces of carbon (C), oxygen (O) and chlorine (CI) were present and depend on the nature of post-deposition treatments. It is worth noting that as-deposited silicon is prone to oxidation. Identified oxygen traces were attributed to the brief exposure of the deposited sample during its handling.

Figure 7A:
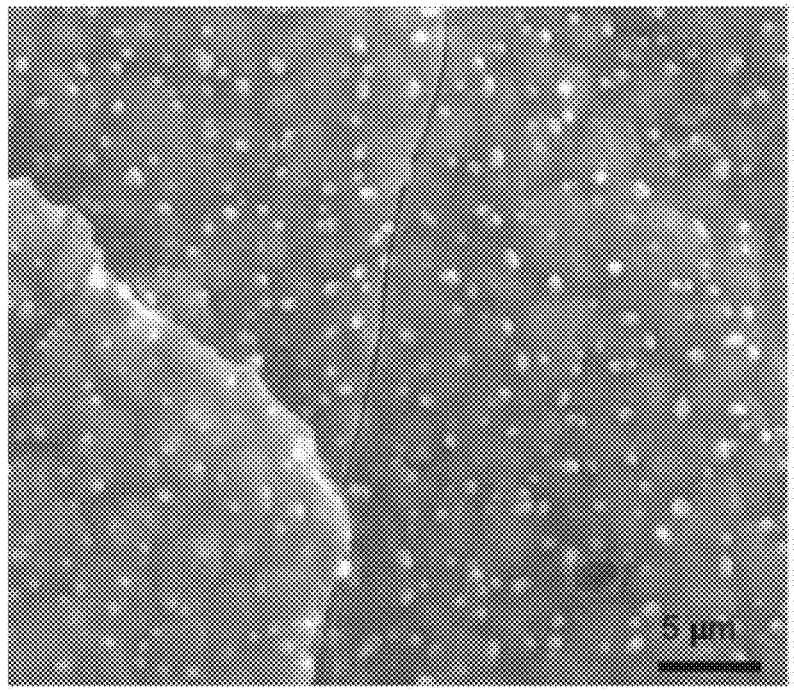
FIGS. 7A and 7B illustrate SEM images of silicon samples plated onto p-type silicon wafers.
Figure 7B:
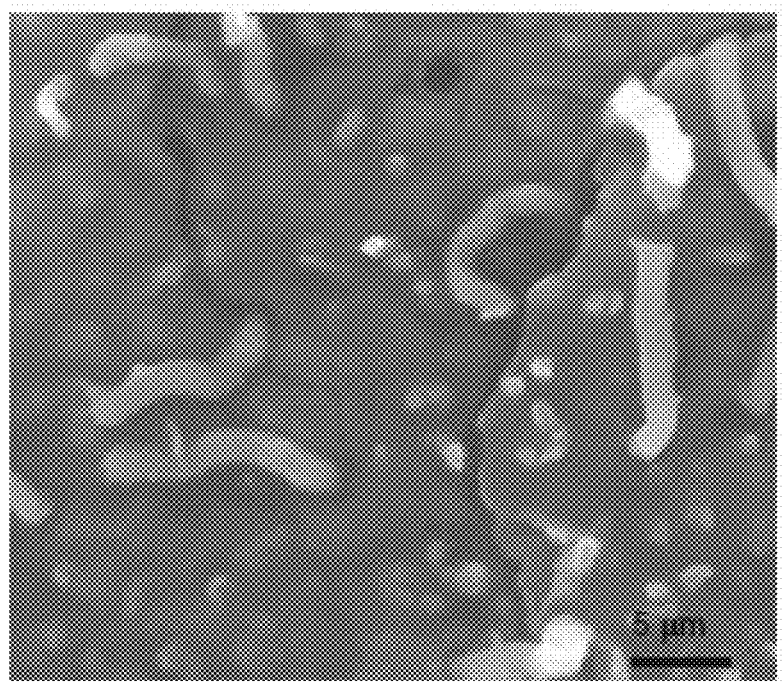

In some examples, the morphology and composition of the plated silicon can be controlled by selecting a substrate and/or applied potential. FIGS. 7A and 7B illustrate SEM images of silicon samples plated onto p-type silicon wafers. Instead of uniform deposits with similar contrast, these silicon samples show dots and wires embedded in the matrix. As such, the electronic conductivity of the substrate allowed controlling the electrochemical reduction of $SiHCl_3$ to silicon, resulting in different types of silicon structures in this experiment.

Figure 8A:
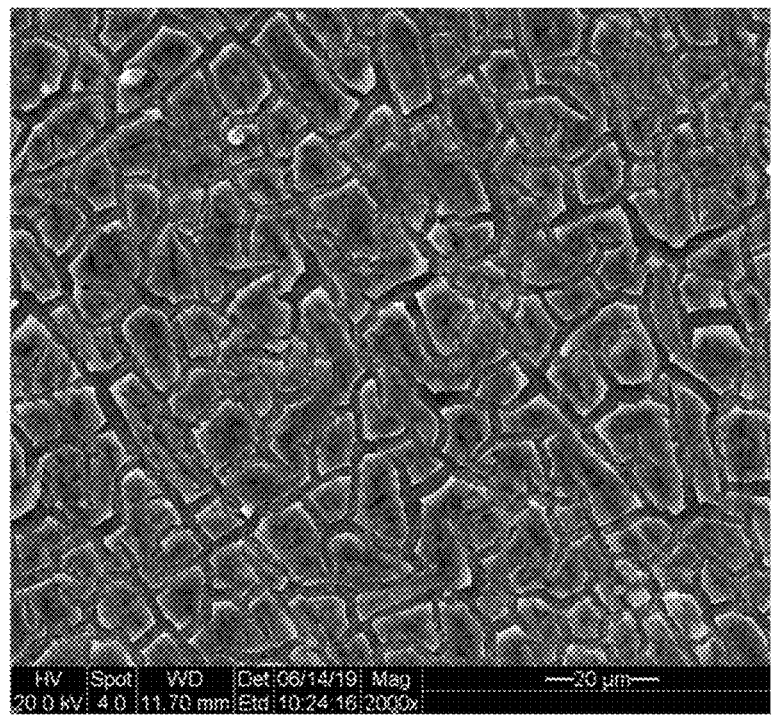
FIG. 8A is an SEM image showing silicon agglomerates on the titanium surface.
Figure 8B:
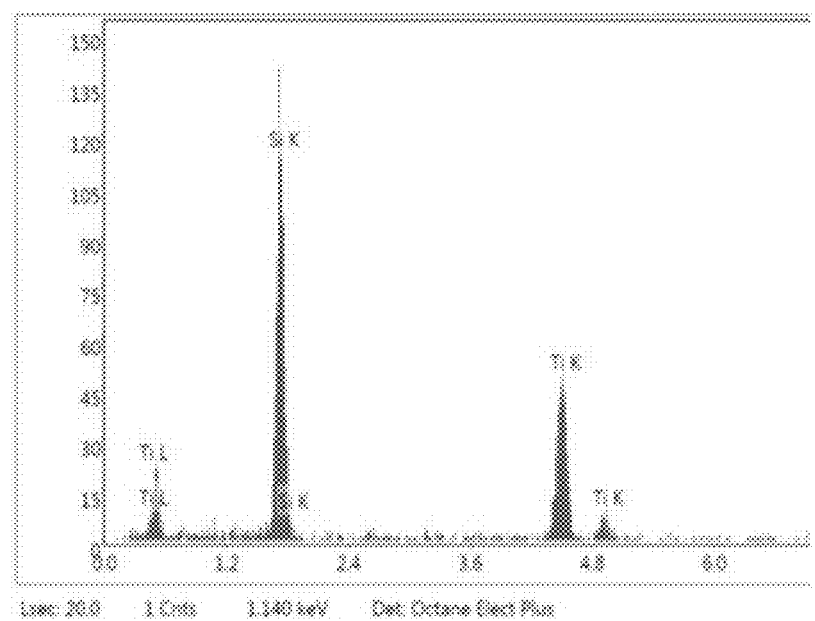
FIG. 8B illustrates the results of EDS analysis of the sample shown in FIG. 8A.

FIG. 8A is an SEM image showing silicon agglomerates on the titanium surface. These agglomerates were different from the samples shown in FIGS. 7A and 7B. The results of the EDS analysis for this sample are presented in FIG. 8B, indicating no detectable impurities, such as chlorine (CI).

Figure 9:
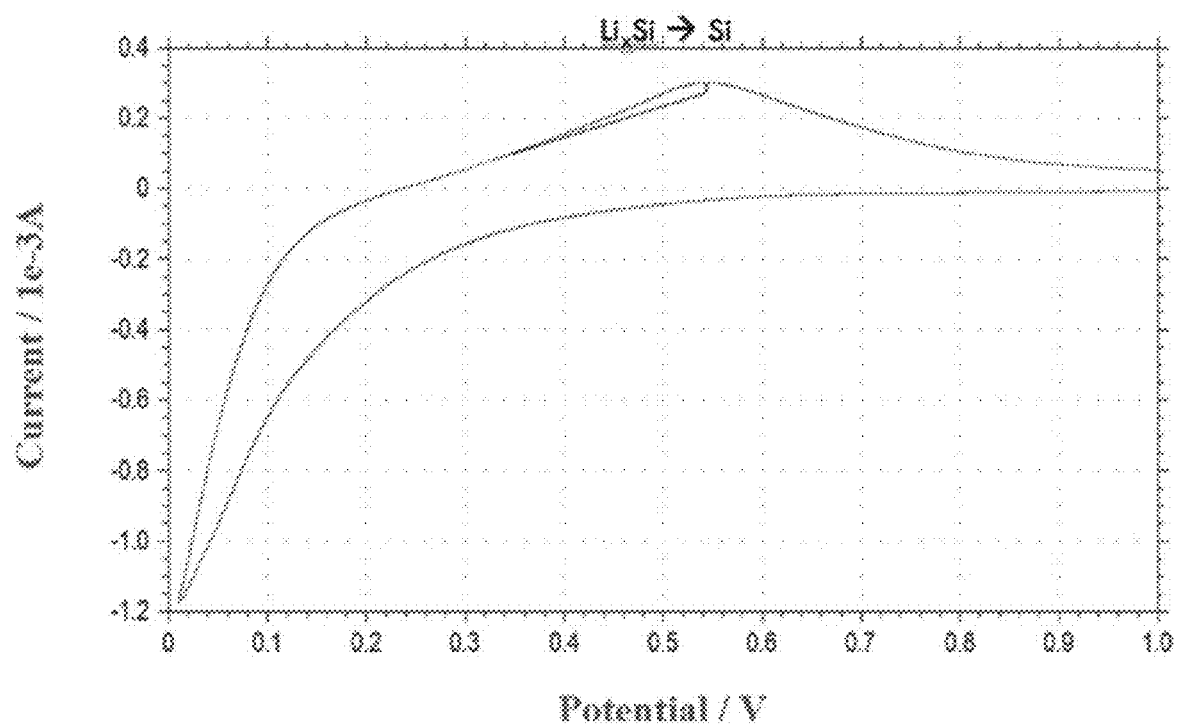
FIG. 9 illustrates a cyclic voltammogram (CV) of silicon, plated on the working electrode and operable as a negative active material in the electrochemical test.

Furthermore, the working electrode was subjected to an electrochemical test, i.e., in an electrolyte solution containing lithium ions. FIG. 9 illustrates a cyclic voltammogram (CV) of silicon, plated on the working electrode and operable as a negative active material in the electrochemical test. Specifically, the dilithiation peak in the CV is located in the 0.4-0.7V range, which matches the expected decomposition reaction of $LixSi \rightarrow Si$.

Another experiment has been conducted to precipitate free-standing powder on a working electrode. Specifically, yellow silicon powder has been obtained in a three-electrode system using a platinum wire, as a working electrode. Large potentials over −5 V, versus a reference electrode that was another platinum wire, were used in this test. Due to the limited surface area of the working electrode and a high electric field (caused by the high voltage on a pointing curvature), silicon was reduced and separated from the substrate, precipitating out as suspension in the plating solution as shown in FIG. 10A. In another experiment shown in FIG. 10B, the potential was increased to −7 V.

Overall, it has been found that the particle size and composition can be tuned by changing the plating parameters, such as solution components, current, voltage window, temperature, electrodes, and mechanical agitation (e.g., stirring or ultra-sonication).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. A method of forming active material structures for electrochemical cells, the method comprising:
   introducing an electroplating liquid solution into an electroplating bath, wherein:
   the electroplating bath comprises a working electrode and a counter electrode submerged into the electroplating liquid solution, and
   the electroplating liquid solution comprises a precursor comprising one or more elements selected from the group consisting of silicon (Si) and germanium (Ge) dissolved in the electroplating liquid solution and forming ions in the electroplating liquid solution;
   applying an electrical potential between the working electrode and the counter electrode and through the electroplating liquid solution and thereby causing the ions to diffuse toward the working electrode and combining with electrons from the working electrode resulting in electrochemical reduction of the ions and formation of the active material structures in the electroplating bath thereby converting the electroplating liquid solution into a suspension, wherein:
   the electrical potential is over −5V, based on a magnitude value, thereby causing the active material structures to precipitate from the precursor in the electroplating liquid solution away from the working electrode instead of depositing on the working electrode due to diffusion and electrode surface limitations,
   the active material structures, forming the suspension after applying the electrical potential and precipitating from the precursor, are standalone structures formed entirely in the electroplating liquid solution using the precursor dissolved in the electroplating liquid solution, and
   the active material structures comprise the one or more elements selected from the group consisting of silicon (Si) and germanium (Ge); and
   collecting, from the suspension, the active material structures formed in the electroplating liquid solution as suspended particles and away from the working electrode.

2. The method of claim 1, wherein the working electrode comprises an insulating mask disposed on a metal surface of the working electrode.

3. The method of claim 1, wherein the precursor of the electroplating liquid solution is selected from the group consisting of trichlorosilane ($SiHCl_3$), silicon tetrachloride ($SiCl_4$), silicon tetrabromide ($SiBr_4$), silicon tetraiodide ($SiI_4$), and germanium halides.

4. The method of claim 1, wherein:
   the precursor of the electroplating liquid solution comprises trichlorosilane, and
   the electroplating liquid solution further comprises at least one of lithium chloride and titanium tetrachloride.

5. The method of claim 1, wherein the electroplating liquid solution further comprises at least one of propylene carbonate (PC), dimethyl carbonate (DMC), or an ionic liquid.

6. The method of claim 1, wherein the electroplating liquid solution further comprises one or more of tetrabutylammonium chloride ($Bu_4NCl$), tetrapropylammonium chloride ($Py_4NCl$), tetraethylammonium chloride ($Et_4NCl$), and lithium chloride (LiCl).

7. The method of claim 1, wherein the electroplating liquid solution is maintained at a temperature of less than 200° C.

8. The method of claim 1, wherein the electroplating liquid solution is maintained at a temperature between 15° C. and 25° C.

9. The method of claim 1, wherein the active material structures comprise a combination of the silicon and lithium.

10. The method of claim 1, wherein the electroplating bath further comprises a reference electrode, formed from one or more of glassy carbon (glassy-C), platinum (Pt), gold (Au), and silicon (Si).

11. The method of claim 1, wherein each of the active material structures comprises a core and a shell, such that the shell has a different composition or structure from the core.

12. The method of claim 1, wherein the working electrode is a platinum wire.

13. The method of claim 1, wherein the electrical potential is at least −7V, based on the magnitude value.

14. The method of claim 1, wherein the active material structures, precipitating in the electroplating liquid solution, are in a form of free-standing powder.

15. The method of claim 1, wherein the active material structures, precipitating in the electroplating liquid solution, gravitationally settle at a bottom of the electroplating bath.

16. The method of claim 1, wherein the active material structures are formed in the electroplating bath under diffusion and surface-limited conditions.

17. The method of claim 1, wherein:
   the precursor of the electroplating liquid solution comprises trichlorosilane, and
   the electroplating liquid solution further comprises lithium chloride.

18. The method of claim 1, wherein the electroplating liquid solution further comprises dimethyl carbonate (DMC).

* * * * *